(12) United States Patent
Morisaki et al.

(10) Patent No.: US 11,444,511 B2
(45) Date of Patent: Sep. 13, 2022

(54) VIBRATION DAMPING DEVICE AND ELECTRICALLY DRIVEN ACTUATOR

(71) Applicant: MITSUBISHI HEAVY INDUSTRIES, LTD., Tokyo (JP)

(72) Inventors: Yuki Morisaki, Tokyo (JP); Yasuhiro Saiki, Tokyo (JP); Kenichi Oyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/274,863

(22) PCT Filed: Apr. 15, 2019

(86) PCT No.: PCT/JP2019/016148
§ 371 (c)(1),
(2) Date: Mar. 10, 2021

(87) PCT Pub. No.: WO2020/054117
PCT Pub. Date: Mar. 19, 2020

(65) Prior Publication Data
US 2022/0060081 A1    Feb. 24, 2022

(30) Foreign Application Priority Data

Sep. 14, 2018 (JP) .............................. JP2018-173028

(51) Int. Cl.
*H02K 5/24*       (2006.01)
*F16F 15/00*      (2006.01)
(Continued)

(52) U.S. Cl.
CPC ............ *H02K 5/24* (2013.01); *F16F 15/002* (2013.01); *F16F 15/005* (2013.01); *F16H 25/20* (2013.01);
(Continued)

(58) Field of Classification Search
CPC .. H02K 5/24; H02K 7/06; F16H 25/20; F16H 25/24; F16H 2025/2075; F16H 15/005
See application file for complete search history.

(56) References Cited

U.S. PATENT DOCUMENTS 3,173,040 A *   3/1965   Cruzan .................. F16H 25/20
                                                  310/83
5,275,388 A     1/1994   Kobayashi et al.
(Continued)

FOREIGN PATENT DOCUMENTS

JP   H05280587 A    10/1993
JP     07081561 A     3/1995
(Continued)

OTHER PUBLICATIONS

International Search Report and Written Opinion of International Application No. PCT/JP2019/016148 dated Jun. 11, 2019; 11pp.

*Primary Examiner* — David M Fenstermacher
(74) *Attorney, Agent, or Firm* — Huaptman Ham, LLP

(57) ABSTRACT

An electrically driven actuator includes a vibration damping device; and an electrically driven unit operated by using electricity. The vibration damping device includes a vibration absorbing unit provided between a first support and a second support provided to face the first support, and expanding and contracting by using electricity, a measurement unit that measures vibrations of the second support, and a control unit that electrically controls the vibration absorbing unit to cancel the vibrations of the second support which are measured by the measurement unit. The electrically driven unit includes a housing provided on a fixed side, a shaft movable in an axial direction which is a direction toward a movable side opposite to the fixed side with respect to the housing, and a drive unit provided between the housing and the shaft, and driving the shaft with respect to the housing.

9 Claims, 3 Drawing Sheets

(51) Int. Cl.
*F16H 25/20* (2006.01)
*F16H 25/24* (2006.01)
*H02K 7/06* (2006.01)

(52) U.S. Cl.
CPC .............. *F16H 25/24* (2013.01); *H02K 7/06* (2013.01); *F16F 2222/06* (2013.01); *F16F 2228/066* (2013.01); *F16F 2230/18* (2013.01); *F16H 2025/2031* (2013.01); *F16H 2025/2075* (2013.01)

(56) References Cited

U.S. PATENT DOCUMENTS

| | | | | |
|---|---|---|---|---|
| 5,689,994 | A * | 11/1997 | Nagai | B23Q 5/34 74/89.32 |
| 2009/0095098 | A1* | 4/2009 | Fisher | F16H 25/20 74/89.23 |
| 2010/0244457 | A1* | 9/2010 | Bhat | D06F 39/006 290/1 A |
| 2015/0345134 | A1* | 12/2015 | Takahashi | F16F 15/027 52/167.2 |
| 2018/0283486 | A1* | 10/2018 | Kim-Whitty | H01L 21/6719 |
| 2019/0385420 | A1* | 12/2019 | Khoshkava | G06F 3/016 |
| 2020/0238876 | A1* | 7/2020 | Dhaens | A61M 21/00 |
| 2021/0091296 | A1* | 3/2021 | Pu | H01L 41/096 |
| 2021/0388885 | A1* | 12/2021 | Takizawa | F16H 1/46 |

FOREIGN PATENT DOCUMENTS

| | | |
|---|---|---|
| JP | 3131090 U | 4/2007 |
| JP | 2010101129 A | 5/2010 |
| JP | 2011147228 A | 7/2011 |
| JP | 2013092183 A | 5/2013 |
| JP | 2014217215 A | 11/2014 |

* cited by examiner

VIBRATION DAMPING DEVICE AND ELECTRICALLY DRIVEN ACTUATOR

RELATED APPLICATIONS

The present application is a National Phase of International Application Number PCT/JP2019/016148 filed Apr. 15, 2019 and claims priority of Japanese Application Number 2018-173028 filed Sep. 14, 2018.

TECHNICAL FIELD

The present invention relates to a vibration damping device and an electrically driven actuator.

BACKGROUND ART

It is desirable to damp vibrations caused by an operation and deformation of a device and equipment which are equipped with an actuator. PTL 1 discloses an example of a vibration damping device that damps torque fluctuations and torsional vibrations of a rotating body which rotates by receiving torque.

CITATION LIST

Patent Literature

[PTL 1] Japanese Unexamined Patent Application Publication No. 2013-92183

SUMMARY OF INVENTION

Technical Problem

Incidentally, a hydraulic actuator in the related art uses hydraulic pressure as a drive source. Accordingly, hydraulic oil has a function of damping vibrations. In contrast, an electrically driven actuator does not have a vibration damping device.

The present invention is made in view of the above-described circumstances, and an object thereof is to provide a vibration damping device and an electrically driven actuator which damp vibrations caused by a wide frequency band.

Solution to Problem

According to the present invention, there is provided a vibration damping device including a vibration absorbing unit provided between a first support and a second support provided to face the first support, and expanding and contracting by using electricity, a measurement unit that measures vibrations of the second support, and a control unit that electrically controls the vibration absorbing unit to cancel the vibrations of the second support which are measured by the measurement unit.

According to this configuration, a frequency of expansion and contraction of the vibration absorbing unit can be changed by electrically controlling the vibration absorbing unit. Therefore, it is possible to damp vibrations caused by a wide frequency band. In addition, the frequency of expansion and contraction of the vibration absorbing unit is electrically controlled, based on the frequency of vibrations of the second support which are measured on a real time basis. Therefore, it is possible to more preferably damp the vibrations.

In addition, it is preferable that the vibration absorbing unit includes a magnetostrictive member that connects the first support and the second support to each other, and at least one coil provided on an outer periphery of the magnetostrictive member whose axial direction is set to a direction in which the first support and the second support face each other. It is preferable that the control unit controls a current flowing through the coil.

According to this configuration, the magnetostrictive member can be expanded and contracted by causing a current to flow through the coil and generating a magnetic field in the magnetostrictive member. Therefore, the magnetostrictive member can be expanded and contracted, based on the frequency of the vibrations of the second support which are measured on a real time basis. In this manner, it is possible to damp the vibrations. In addition, the magnetostrictive member has quick responsiveness and a wide range of corresponding frequencies. Therefore, it is possible to damp the vibrations caused by a wider frequency band.

In addition, it is preferable that a plurality of the coils are provided to be aligned in the axial direction.

According to this configuration, it is possible to damp combined vibrations caused by different frequency bands.

In addition, it is preferable that the vibration absorbing unit includes an electrostrictive member that connects the first support and the second support to each other. It is preferable that the control unit controls a voltage applied to the electrostrictive member.

According to this configuration, the electrostrictive member can be expanded and contracted by directly applying a voltage to the electrostrictive member. Therefore, the electrostrictive member can be expanded and contracted by applying the voltage, based on the frequency of the vibrations of the second support which are measured on a real time basis. In this manner, it is possible to damp the vibrations. In addition, the expansion and contraction of the vibration absorbing unit can be more preferably controlled by directly applying the voltage to the electrostrictive member.

In addition, it is preferable that the electrostrictive member is a laminate obtained by laminating a plurality of the electrostrictive members in a direction in which the first support and the second support face each other.

According to this configuration, it is possible to increase the amount of expansion and contraction of the electrostrictive member.

In addition, according to the present invention, there is provided an electrically driven actuator including the vibration damping device and an electrically driven unit operated by using electricity. The electrically driven unit includes a housing provided on a fixed side, a shaft movable in the axial direction which is a direction toward a movable side opposite to the fixed side with respect to the housing, and a drive unit provided between the housing and the shaft, and driving the shaft with respect to the housing.

According to this configuration, the frequency of expansion and contraction of the vibration absorbing unit can be changed by electrically controlling the vibration absorbing unit. Therefore, it is possible to damp the vibrations of the electrically driven actuator caused by a wide frequency band. In addition, the frequency of expansion and contraction of the vibration absorbing unit is electrically controlled, based on the frequency of the vibrations of the second support which are measured on a real time basis. Therefore, it is possible to more preferably damp the vibrations of the electrically driven actuator.

In addition, it is preferable that the drive unit includes a screw shaft connected to the housing, and rotating around an axis, a nut attached to the screw shaft, and a drive source that drives rotation of the screw shaft. It is preferable that the shaft is fixed to the nut, and linearly moves in the axial direction via the nut by the rotation of the screw shaft.

According to this configuration, it is possible to damp the vibrations of the electrically driven actuator with a simple configuration.

In addition, it is preferable that the shaft includes a first shaft and a second shaft movable in the axial direction with respect to the first shaft. It is preferable that the first support includes the first shaft, and the second support includes the second shaft. It is preferable that the vibration absorbing unit is provided between the first shaft and the second shaft.

According to this configuration, it is possible to damp the vibrations in the shaft on a movable side of the electrically driven actuator. Therefore, the vibrations can be further prevented from being transmitted to the fixed side.

In addition, it is preferable that the shaft includes a first shaft and a second shaft movable in the axial direction with respect to the first shaft. It is preferable that the first support includes the drive unit, and the second support includes the second shaft. It is preferable that the vibration absorbing unit includes the first shaft provided between the drive unit and the second shaft.

According to this configuration, the electrically driven actuator can have a simpler structure.

In addition, it is preferable that the first support includes the housing, and the second support includes the drive unit. It is preferable that the vibration absorbing unit is provided between the housing and the drive unit.

According to this configuration, the electrically driven actuator can have a simpler structure.

DESCRIPTION OF EMBODIMENTS

Figure 1:
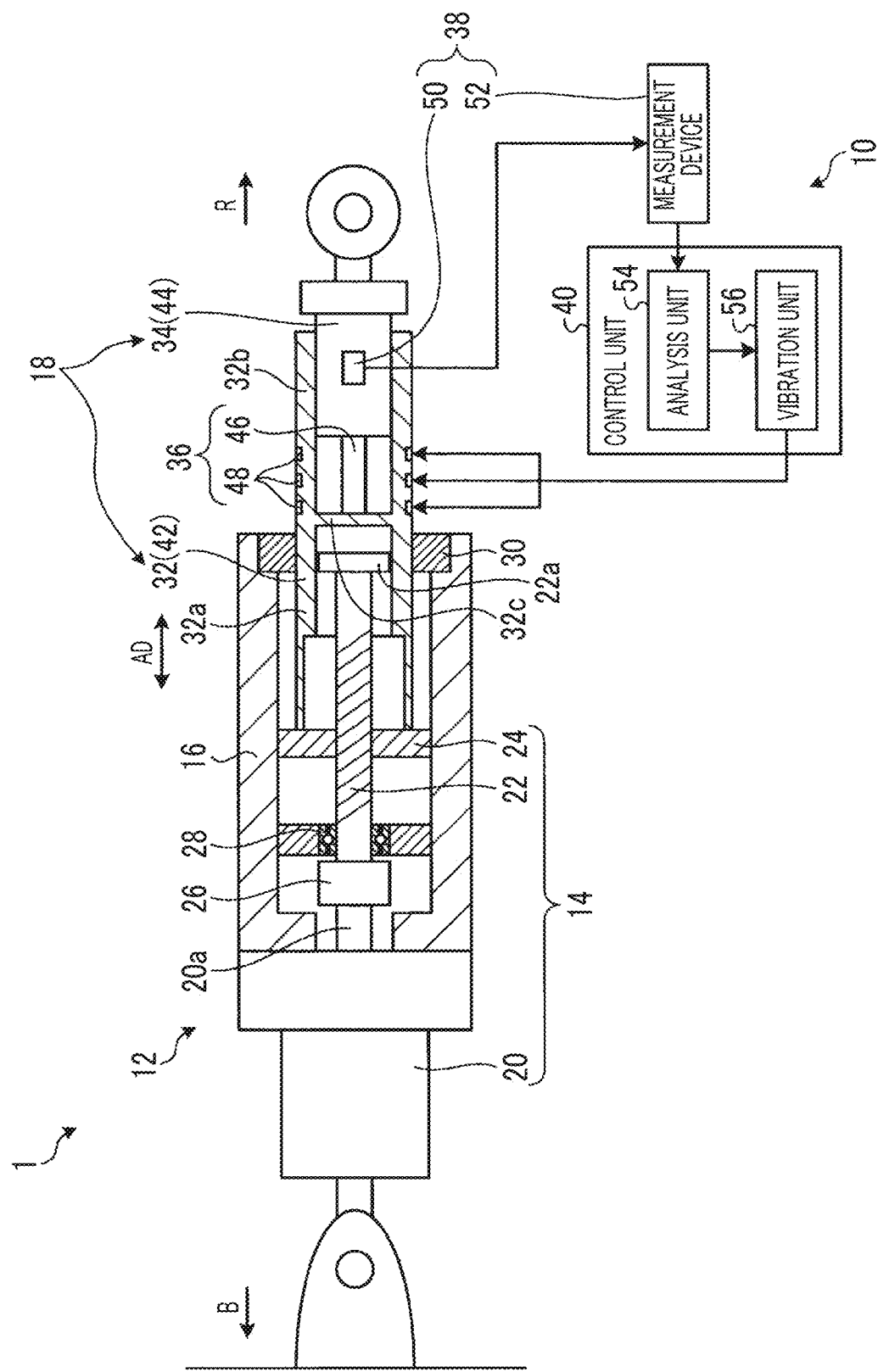
FIG. 1 is a schematic view illustrating an electrically driven actuator including a vibration damping device of a first embodiment.

Hereinafter, embodiments of a vibration damping device and an electrically driven actuator according to the present invention will be described in detail with reference to the drawings. The present invention is not limited to the embodiments. In addition, configuration elements in the following embodiments include those which can be easily replaced by those skilled in the art, or those which are substantially the same. Furthermore, the configuration elements described below can be appropriately combined with each other. In the following description of the embodiments, the same reference numerals will be assigned to the same configurations, and different reference numerals will be assigned to different configurations.

Electrically driven actuators 1 and 2 described in the following respective embodiments are actuators that use electricity for power. In the following embodiments, the electrically driven actuators 1 and 2 are provided between an airframe B and a rudder surface R of an aircraft. A fixed side of the electrically driven actuators 1 and 2 is the airframe B side, and a movable side is the rudder surface R side. For example, the electrically driven actuators 1 and 2 expand and contract by converting a rotational force of an electric motor into a linear motion on the movable side. Vibration damping devices 10 and 60 described in the following embodiments absorb vibrations such as a flutter and a buzz on the rudder surface R of the aircraft which are applied to the electrically driven actuators 1 and 2.

First Embodiment

Figure 2:
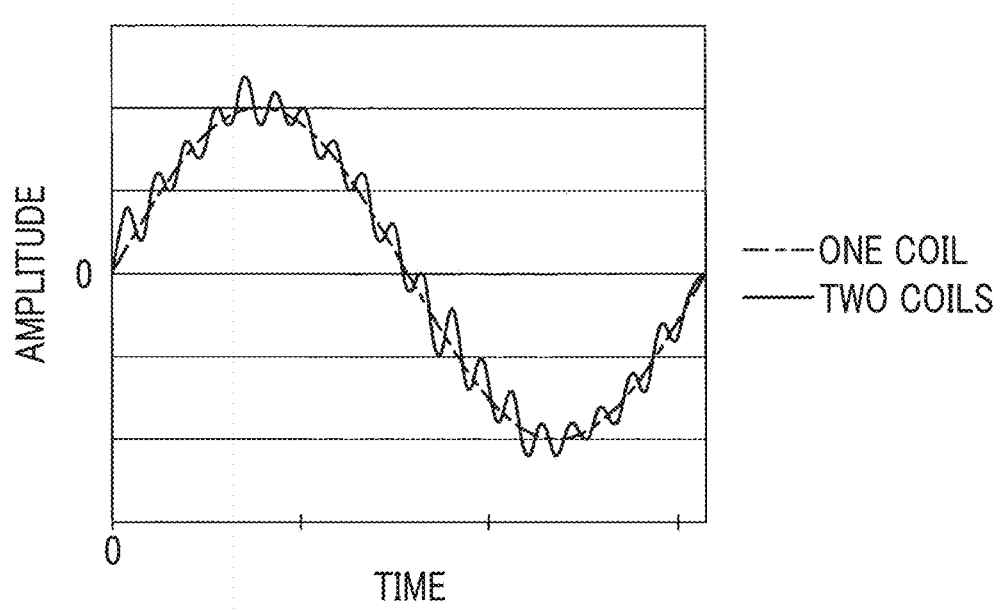
FIG. 2 is a graph illustrating an example of a vibration waveform generated by the vibration damping device of the first embodiment.

The electrically driven actuator 1 and the vibration damping device 10 of a first embodiment will be described with reference to FIGS. 1 and 2. FIG. 1 is a schematic view illustrating the electrically driven actuator including the vibration damping device of the first embodiment. As illustrated in FIG. 1, the electrically driven actuator 1 includes the vibration damping device 10 and an electrically driven unit 12. First, a configuration of the electrically driven unit 12 will be described. The electrically driven unit 12 is operated by electricity. The electrically driven unit 12 includes a drive unit 14, a housing 16, and a shaft 18.

In the present embodiment, the drive unit 14 includes a drive source 20, a screw shaft 22, and a nut 24. For example, the drive source 20 is an electric motor. In the present embodiment, a drive shaft 20a of the drive source 20 is connected to one end of the screw shaft 22 via a shaft coupling 26. In the present embodiment, the drive source 20 is provided on the airframe B side of the housing 16. The screw shaft 22 is provided inside the housing 16 along an axial direction AD. The screw shaft 22 is connected to the housing 16 via a rolling bearing 28 provided in a radial direction. In the present embodiment, one end of the screw shaft 22 is connected to the drive shaft 20a of the drive source 20 via a shaft coupling 26. The screw shaft 22 is rotated around an axis by the drive source 20. The nut 24 is attached to the screw shaft 22. The nut 24 linearly moves in the axial direction AD by the rotation of the screw shaft 22.

The housing 16 is a member on the fixed side (airframe B side) in the electrically driven actuator 1. The housing 16 is connected to the airframe B. The housing 16 has a tubular shape that houses the drive source 20, the screw shaft 22, the nut 24, and a portion of the shaft 18.

The shaft 18 is a member on the movable side (rudder surface R side) in the electrically driven actuator 1. In the present embodiment, the shaft 18 includes a first shaft 32 and a second shaft 34. The first shaft 32 has a first tubular portion 32a, a second tubular portion 32b, and a partition 32c. The first tubular portion 32a extends in the axial direction AD from an end portion on the airframe B side. The second tubular portion 32b extends in the axial direction AD from an end portion on the rudder surface R side. The partition 32c is a wall that partitions the first tubular portion 32a and the second tubular portion 32b in the axial direction AD. A portion of the screw shaft 22 on the rudder surface R side from the nut 24 is provided inside the first tubular portion 32a. An end portion of the first shaft 32 on the airframe B side is fixed to the nut 24. The first shaft 32 linearly moves in the axial direction AD via the nut 24 by the rotation of the screw shaft 22. That is, the first shaft 32 linearly moves with respect to the housing 16 via the drive unit 14. The screw shaft 22 has a stopper 22a provided in a tip thereof. The stopper 22a limits a maximum movement amount of the first shaft 32 with respect to the housing 16. Specifically, the stopper 22a comes into contact with the partition 32c, thereby restricting a movement of the first shaft 32 to the airframe B side. An end portion of the housing 16 on the rudder surface R side and a peripheral surface of the first shaft 32 are closed by a seal 30. The seal 30 is a reciprocating seal that prevents dust from entering the inside of the housing 16. For example, the seal 30 is a dust seal. The second shaft 34 is provided on the rudder surface R side of the first shaft 32. The second shaft 34 has a pillar shape provided inside the second tubular portion 32b. The second shaft 34 can move in the axial direction AD with respect to the first shaft 32. The second shaft 34 is connected to the rudder surface R.

Next, the vibration damping device 10 will be described. The vibration damping device 10 includes a vibration absorbing unit 36, a measurement unit 38, and a control unit 40.

The vibration absorbing unit 36 is provided between a first support 42 and a second support 44. The second support 44 is provided to face the first support 42. In the present embodiment, the first support 42 includes the first shaft 32. In the present embodiment, the second support 44 includes the second shaft 34. In the present embodiment, the vibration absorbing unit 36 is provided between the first shaft 32 and the second shaft 34. The vibration absorbing unit 36 expands and contracts by using electricity.

In the present embodiment, the vibration absorbing unit 36 includes a magnetostrictive member 46 and three coils 48. The magnetostrictive member 46 connects to the first support 42 and the second support 44 to each other in the axial direction AD. The first support 42 and the second support 44 face each other in the axial direction AD. The magnetostrictive member 46 is a pillar-shaped member formed of a magnetic material. For example, the magnetic material is iron. The magnetostrictive member 46 is magnetized to expand and contract in the axial direction AD. For example, a displacement amount of the magnetostrictive member 46 in the axial direction AD is approximately 1% of a length. Responsiveness of the magnetostrictive member 46 is on the order of 10 to 100 kHz. In the present embodiment, the magnetostrictive member 46 is provided inside the second tubular portion 32b of the first shaft 32. In the present embodiment, the magnetostrictive member 46 is connected to the partition 32c of the first shaft 32 in an end portion on the airframe B side. In the present embodiment, the magnetostrictive member 46 is connected to an end portion of the second shaft 34 on the airframe B side in an end portion on the rudder surface R side. The magnetostrictive member 46 is joined to the first shaft 32 and the second shaft 34 by means of welding, for example. The coil 48 is provided to face the magnetostrictive member 46 in the radial direction. In the present embodiment, the coil 48 is provided on an outer periphery of the second tubular portion 32b of the first shaft 32. In the present embodiment, three coils 48 are provided. However, at least one coil 48 may be provided, and it is preferable that two or more coils 48 are provided. The plurality of coils 48 are provided to be aligned in the axial direction AD. A current flows through the coil 48 in the vibration absorbing unit 36 so that a magnetic field parallel to the axial direction AD is generated inside the coil 48. The magnetostrictive member 46 is magnetized by the magnetic field parallel to the axial direction AD which is generated by the coil 48, and expands and contracts in the axial direction AD.

The measurement unit 38 measures vibrations of the second support 44. In the present embodiment, the measurement unit 38 measures the vibrations of the second shaft 34. The measurement unit 38 includes a sensor 50 and a measurement device 52. In the present embodiment, the sensor 50 is a strain gauge. The sensor 50 is provided on a peripheral surface of the second shaft 34. The sensor 50 outputs a signal obtained by a strain of the second shaft 34 to the measurement device 52. The measurement device 52 measures a change in the strain of the second shaft 34, based on the signal input from the sensor 50. The measurement device 52 measures the vibrations of the second shaft 34 in accordance with the change in the strain of the second shaft 34. The measurement device 52 may be provided inside the electrically driven actuator 1, or may be provided outside the electrically driven actuator 1. In the present embodiment, the sensor 50 is the strain gauge. However, any desired sensor may be used as long as the sensor measures the vibrations of the second shaft 34. For example, a displacement and a load may be measured.

The control unit 40 includes an analysis unit 54 and a vibration unit 56. The control unit 40 may be provided inside the electrically driven actuator 1, or may be provided outside the electrically driven actuator 1. For example, the analysis unit 54 may be provided in a control device different from the control unit 40. The control unit 40 includes an arithmetic processing device that executes a predetermined control program. For example, the arithmetic processing device includes an integrated circuit such as a central processing unit (CPU). The analysis unit 54 acquires vibration data of the second shaft 34 which is measured by the measurement unit 38. The control unit 40 causes the analysis unit 54 to analyze a frequency from the vibration data of the second shaft 34 on a real time basis, and to calculate a vibration frequency which cancels the vibrations of the second shaft 34. The control unit 40 controls a current flowing through the coil 48. The control unit 40 causes the vibration unit 56 so that the current having the vibration frequency calculated by the analysis unit 54 flows to the coil 48. The magnetic field inside the coil 48 is changed in response to the frequency. In this manner, the magnetostrictive member 46 repeatedly expands and contracts in the axial direction AD in response to the frequency, and cancels the vibrations of the second shaft 34. That is, the control unit 40 electrically controls the vibration absorbing unit 36 to cancel the vibrations of the second shaft 34 which are measured by the measurement unit 38. In this manner, the vibration damping device 10 damps the vibrations applied to the rudder surface R side of the electrically driven actuator 1.

In the present embodiment, the control unit 40 can cause the vibration unit 56 so that the currents having mutually different frequencies flow to the three coils 48. FIG. 2 is a graph illustrating an example of a vibration waveform generated by the vibration damping device of the first embodiment. As illustrated in FIG. 2, for example, in a case where a current having a predetermined frequency and amplitude flows to one coil, the vibration waveform forms a sine wave. In a case where currents having mutually different frequencies and amplitudes flow to two coils, the vibration waveform forms a composite wave. Since the plurality of coils 48 are provided, the vibration damping device 10 can apply the vibrations to the magnetostrictive member 46 by using a waveform in which waveforms having different frequencies and amplitudes are combined with each other. That is, the magnetostrictive member 46 expands and contracts in the axial direction AD, in accordance with the displacement amount generated by the waveform in which the waveforms having different frequencies and amplitudes are combined with each other. In this manner, the vibration damping device 10 can damp the combined vibrations caused by different frequency bands.

As described above, according to the vibration damping device 10 and the electrically driven actuator 1 of the first embodiment, the frequency of expansion and contraction of the vibration absorbing unit 36 can be changed by electrically controlling the vibration absorbing unit 36. Therefore, it is possible to damp the vibrations caused by a wide frequency band. In addition, the frequency of expansion and contraction of the vibration absorbing unit 36 is electrically controlled, based on the frequency of the vibrations of the second shaft 34 (second support 44) which are measured on a real time basis. Therefore, it is possible to more preferably damp the vibrations.

In addition, in the vibration damping device 10 and the electrically driven actuator 1 of the first embodiment, the vibration absorbing unit 36 includes the magnetostrictive member 46 that connects the first shaft 32 (first support 42) and the second shaft 34 (second support 44) to each other, and at least one coil 48 provided on the outer periphery of the magnetostrictive member 46 whose axial direction AD is set to a direction in which the first shaft 32 and the second shaft 34 face each other. The control unit 40 controls the current flowing through the coil 48. Since the magnetostrictive member 46 can be expanded and contracted by causing the current to flow through the coil 48 and generating the magnetic field in the magnetostrictive member 46. Therefore, the magnetostrictive member 46 can be expanded and contracted, based on the frequency of the vibrations of the second shaft 34 which are measured on a real time basis. In this manner, it is possible to damp the vibrations. In addition, the magnetostrictive member 46 has quick responsiveness and a wide range of corresponding frequencies. Therefore, it is possible to damp the vibrations caused by a wider frequency band.

In addition, the plurality of coils 48 are provided to be aligned in the axial direction AD. In this manner, it is possible to damp the combined vibrations caused by different frequency bands.

In addition, the drive unit 14 includes a screw shaft 22 connected to the housing 16 and rotating around an axis, a nut 24 attached to the screw shaft 22, and a drive source 20 that drives the rotation of the screw shaft 22. The shaft 18 is fixedly provided to the nut 24, and linearly moves in the axial direction AD via the nut 24 by the rotation of the screw shaft 22. Therefore, it is possible to damp the vibrations of the electrically driven actuator 1 with a simple configuration.

In addition, the shaft 18 includes a first shaft 32 and a second shaft 34 which are movable in the axial direction AD with respect to the first shaft 32. The first support 42 includes the first shaft 32. The second support 44 includes the second shaft 34. The vibration absorbing unit 36 is provided between the first shaft 32 and the second shaft 34. Therefore, it is possible to damp the vibrations in the shaft 18 on the movable side in the electrically driven actuator 1. In this manner, the vibrations can be further prevented from being transmitted to the fixed side.

In the present embodiment, the vibration absorbing unit 36 is provided between the first shaft 32 and the second shaft 34. However, the vibration absorbing unit 36 may include the first shaft 32. That is, at least a portion of the first shaft 32 may be formed of a magnetic material, and the coil 48 may be provided on the outer periphery of the housing 16 to face the first shaft 32 in the radial direction. In a case where the first shaft 32 is provided in the vibration absorbing unit 36, the first support 42 includes the drive unit 14, and the second support 44 includes the second shaft 34. As in the present embodiment, the first shaft 32 is provided between the drive unit 14 and the second shaft 34.

The first support 42 includes the drive unit 14. The second support 44 includes the second shaft 34. The vibration absorbing unit 36 includes the first shaft 32 provided between the drive unit 14 and the second shaft 34. In this manner, the electrically driven actuator 1 can have a simpler structure.

The vibration absorbing unit 36 may be provided between the housing 16 and the drive unit 14. In a case where the vibration absorbing unit 36 is provided between the housing 16 and the drive unit 14, the first support 42 includes the housing 16, and the second support 44 includes the drive unit 14.

The first support 42 includes the housing 16. The second support 44 includes the drive unit 14. The vibration absorbing unit 36 is provided between the housing 16 and the drive unit 14. Therefore, the electrically driven actuator 1 can have a simpler structure.

A plurality of the vibration absorbing units 36 may be provided. In addition, a plurality of the magnetostrictive members 46 may be provided in one vibration absorbing unit 36. In a case where the plurality of magnetostrictive members 46 are provided, all of the magnetostrictive members 46 are disposed in series in the axial direction AD.

Second Embodiment

Figure 3:
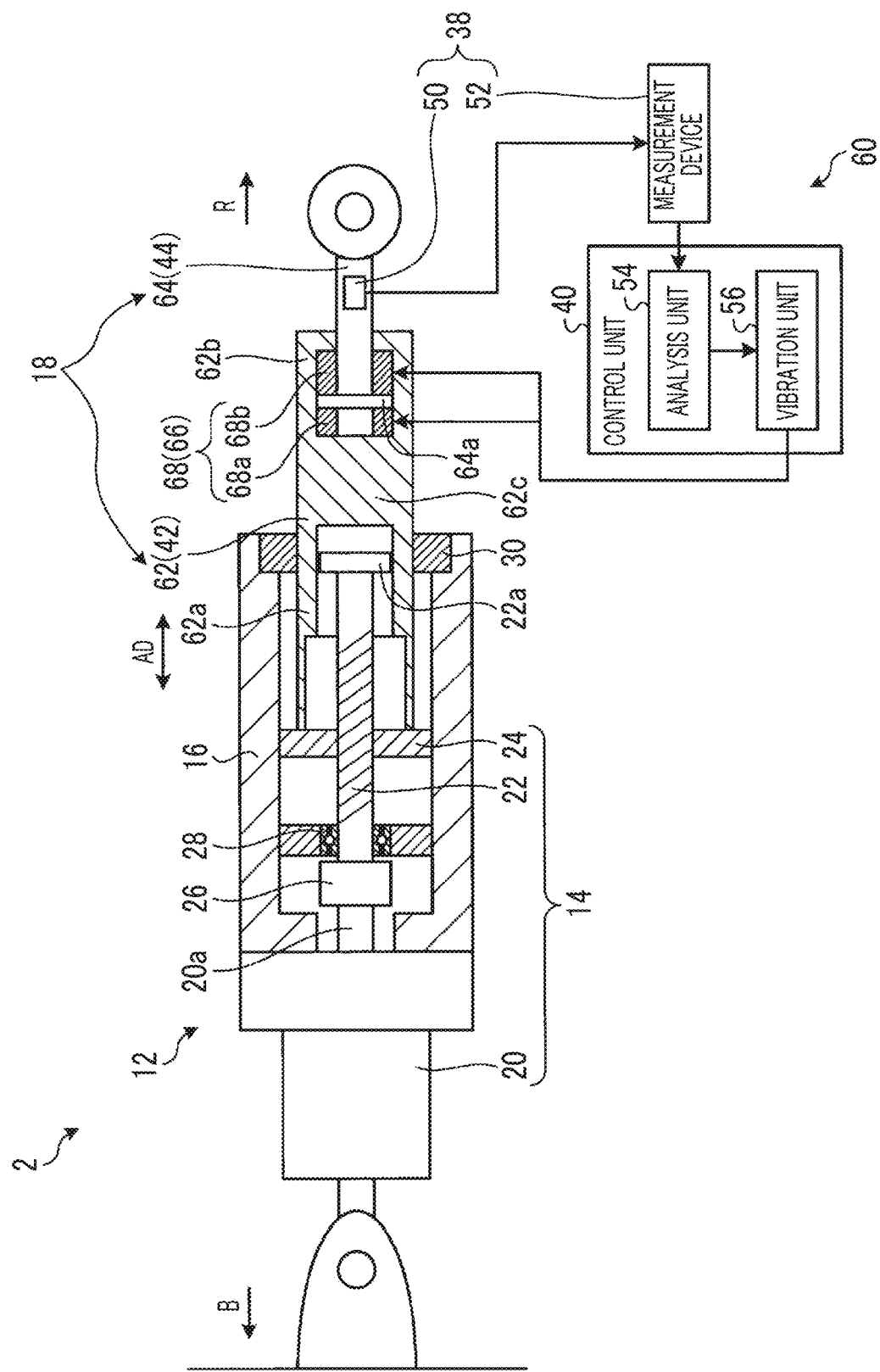
FIG. 3 is a schematic view illustrating an electrically driven actuator including a vibration damping device of a second embodiment.

An electrically driven actuator 2 and a vibration damping device 60 of a second embodiment will be described with reference to FIG. 3.

The electrically driven actuator 2 is different from the electrically driven actuator 1 of the first embodiment in a configuration of the shaft 18. The vibration damping device 60 is provided instead of the vibration damping device 10, and other configurations are the same as those of the first embodiment. In the electrically driven actuator 2 of the second embodiment, the same reference numerals will be assigned to the same configurations as those of the electrically driven actuator 1 of the first embodiment. Repeated description will be omitted, and different configurations will be described.

In the electrically driven actuator 2 of the second embodiment, the shaft 18 includes a first shaft 62 and a second shaft 64 instead of the first shaft 32 and the second shaft 34. The first shaft 62 has a first tubular portion 62a, a second tubular portion 62b, and a partition 62c. The first tubular portion 62a extends in the axial direction AD from an end portion on the airframe B side. The second tubular portion 62b is provided on the rudder surface R side of the first tubular portion 62a. The partition 62c is a wall that partitions the first tubular portion 62a and the second tubular portion 62b in the axial direction AD. A portion on the rudder surface R side from the nut 24 in the screw shaft 22 is provided inside the first tubular portion 62a. The end portion of the first shaft 62 on the airframe B side is fixed to the nut 24. The stopper 22a provided in the tip of the screw shaft 22 limits a maximum movement amount of the first shaft 62 with respect to the housing 16. Specifically, the stopper 22a comes into contact with the partition 62c, thereby restricting the movement of the first shaft 62 to the airframe B side. The end portion of the housing 16 on the rudder surface R side and the peripheral surface of the first shaft 62 are closed by the seal 30. The second shaft 64 is provided on the rudder surface R side of the first shaft 62. The second shaft 64 includes a pillar shape provided inside the second tubular portion 62b, and a flange section 64a. The flange section 64a divides the inside of the second tubular portion 62b into the airframe B side and the rudder surface R side. The second shaft 34 can move in the axial direction AD with respect to the first shaft 32. The second shaft 34 is connected to the rudder surface R.

The vibration damping device 60 includes a vibration absorbing unit 66 instead of the vibration absorbing unit 36 of the first embodiment. The vibration absorbing unit 66 is provided between the first support 42 and the second support 44. In the present embodiment, the first support 42 includes the first shaft 62. In the present embodiment, the second support 44 includes the second shaft 64. In the present embodiment, the vibration absorbing unit 66 is provided between the first shaft 62 and the second shaft 64. The vibration absorbing unit 36 expands and contracts by using electricity.

In the present embodiment, the vibration absorbing unit 66 includes an electrostrictive member 68. The electrostrictive member 68 connects the first support 42 and the second support 44 to each other. The electrostrictive member 68 is a ring-shaped member provided to include a piezoelectric element. For example, the piezoelectric element is ceramic. The electrostrictive member 68 expands and contracts in the axial direction AD by an electric field applied thereto. In the present embodiment, the electrostrictive member 68 includes a first laminate 68a and a second laminate 68b in which a plurality of the electrostrictive members 68 are laminated in the axial direction AD. The first laminate 68a and the second laminate 68b are provided inside the second tubular portion 62b of the first shaft 62. The first laminate 68a is connected to the first shaft 62 in the end portion on the airframe B side. The first laminate 68a is connected to the flange section 64a of the second shaft 64 in the end portion on the rudder surface R side. The second laminate 68b is connected to the flange section 64a of the second shaft 64 in the end portion on the airframe B side. The second laminate 68b is connected to the first shaft 62 in the end portion on the rudder surface R side. The first laminate 68a and the second laminate 68b, and the first shaft 62 and the second shaft 64 are joined to each other by an adhesive, for example.

In this vibration damping device 60, the control unit controls the voltage applied to the electrostrictive member 68. The control unit 40 causes the vibration unit to apply the voltage of the vibration frequency calculated by the analysis unit 54 to the electrostrictive member 68, based on the vibrations of the second shaft 64 which are measured by the measurement unit 38. The control unit 40 can cause the vibration unit 56 to apply voltages having mutually different frequencies to the first laminate 68a and the second laminate 68b. The electric field of the electrostrictive member 68 is changed in response to the frequency. In this manner, the electrostrictive member 68 repeatedly expands and contracts in the axial direction AD in response to the frequency. At this time, the control unit 40 controls the first laminate 68a and the second laminate 68b so that respective displacements in the axial directions AD are positively and negatively symmetrical. In this manner, the flange section 64a of the second shaft 64 repeatedly moves in the axial direction AD to cancel the vibrations of the second shaft 64. That is, the control unit 40 electrically controls the vibration absorbing unit 66 to cancel the vibrations of the second shaft 64 which are measured by the measurement unit 38. In this manner, the vibration damping device 60 damps the vibrations applied to the rudder surface R side of the electrically driven actuator 2.

As described above, in the vibration damping device 60 and the electrically driven actuator 2 of the second embodiment, the vibration absorbing unit 66 includes the electrostrictive member 68 that connects the first shaft 62 (first support 42) and the second shaft 64 (second support 44) to each other. The control unit 40 controls the voltage applied to the electrostrictive member 68. The electrostrictive member 68 can be expanded and contracted by directly applying the voltage to the electrostrictive member 68. Therefore, the electrostrictive member 68 can be expanded and contracted by applying the voltage, based on the frequency of the vibrations of the second shaft 64 which are measured on a real time basis. In this manner, it is possible to damp the vibrations. In addition, the expansion and contraction of the vibration absorbing unit 66 can be more preferably controlled by directly applying the voltage to the electrostrictive member 68.

In addition, the electrostrictive member 68 is the laminate (first laminate 68a and second laminate 68b) obtained by laminating the plurality of electrostrictive members 68 in the direction (axial direction AD) in which the first shaft 62 (first support 42) and the second shaft (second support 44) face each other. Therefore, it is possible to increase the amount of expansion and contraction of the electrostrictive member 68.

REFERENCE SIGNS LIST 1, 2 electrically driven actuator
10, 60 vibration damping device
12 electrically driven unit
14 drive unit
16 housing
18 shaft
20 drive source
20a drive shaft
22 screw shaft
22a stopper
24 nut
26 shaft coupling
28 rolling bearing
30 seal
32, 62 first shaft
32a, 62a first tubular portion
32b, 62b second tubular portion
32c, 62c partition
34, 64 second shaft
64a flange section
36, 66 vibration absorbing unit
38 measurement unit
40 control unit
42 first support
44 second support
46 magnetostrictive member
48 coil
50 sensor
52 measurement device
54 analysis unit
56 vibration unit
68 electrostrictive member
68a first laminate
68b second laminate
B airframe
R rudder surface
AD axial direction

The invention claimed is:
1. An electrically driven actuator between a fixed side and a movable side of an aircraft and moving linearly in an axial direction which is a direction toward the movable side opposite to the fixed side comprising:
- a vibration damping device; and
- an electrically driven unit operated by using electricity, wherein the vibration damping device includes
- a vibration absorbing unit provided between a first support and a second support provided to face the first support, and expanding and contracting by using electricity,
- a measurement unit that measures vibrations of the second support, and
- a control unit that electrically controls the vibration absorbing unit to cancel the vibrations of the second support which are measured by the measurement unit, and wherein the electrically driven unit includes
- a housing provided on a fixed side,
- a shaft movable in the axial direction which is a direction toward a movable side opposite to the fixed side with respect to the housing, and
- a drive unit provided between the housing and the shaft, and driving the shaft with respect to the housing.

2. The electrically driven actuator according to claim 1, wherein the drive unit includes
- a screw shaft connected to the housing, and rotating around an axis,
- a nut attached to the screw shaft, and
- a drive source that drives rotation of the screw shaft, and the shaft is fixed to the nut, and linearly moves in the axial direction via the nut by the rotation of the screw shaft.

3. The electrically driven actuator according to claim 1, wherein the shaft includes a first shaft and a second shaft movable in the axial direction with respect to the first shaft,
the first support includes the first shaft,
the second support includes the second shaft, and
the vibration absorbing unit is provided between the first shaft and the second shaft.

4. The electrically driven actuator according to claim 1, wherein the shaft includes a first shaft and a second shaft movable in the axial direction with respect to the first shaft,
the first support includes the drive unit,
the second support includes the second shaft, and
the vibration absorbing unit includes the first shaft provided between the drive unit and the second shaft.

5. The electrically driven actuator according to claim 1, wherein the first support includes the housing,
the second support includes the drive unit, and
the vibration absorbing unit is provided between the housing and the drive unit.

6. The electrically driven actuator according to claim 1, wherein the vibration absorbing unit includes
- a magnetostrictive member that connects the first support and the second support to each other, and
- at least one coil provided on an outer periphery of the magnetostrictive member whose axial direction is set to a direction in which the first support and the second support face each other, and the control unit controls a current flowing through the coil.

7. The electrically driven actuator according to claim 6, wherein a plurality of the coils are provided to be aligned in the axial direction.

8. The electrically driven actuator according to claim 1, wherein the vibration absorbing unit includes an electrostrictive member that connects the first support and the second support to each other, and
the control unit controls a voltage applied to the electrostrictive member.

9. The electrically driven actuator according to claim 8, wherein the electrostrictive member is a laminate obtained by laminating a plurality of the electrostrictive members in a direction in which the first support and the second support face each other.

* * * * *